No. 662,450. Patented Nov. 27, 1900.
J. B. LINN & M. W. DAY.
CONTROLLER FOR ELECTRIC MOTORS.
(Application filed Sept. 17, 1898.)
(No Model.) 2 Sheets—Sheet 2.
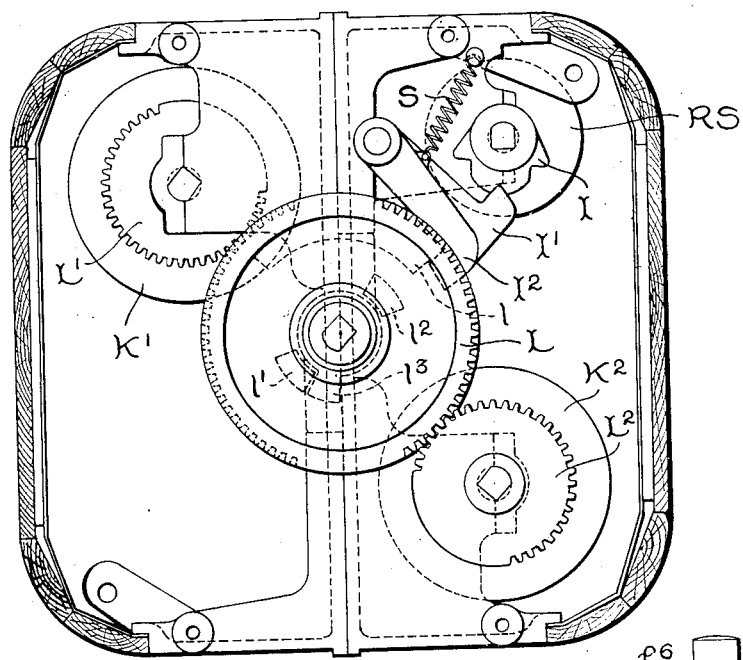
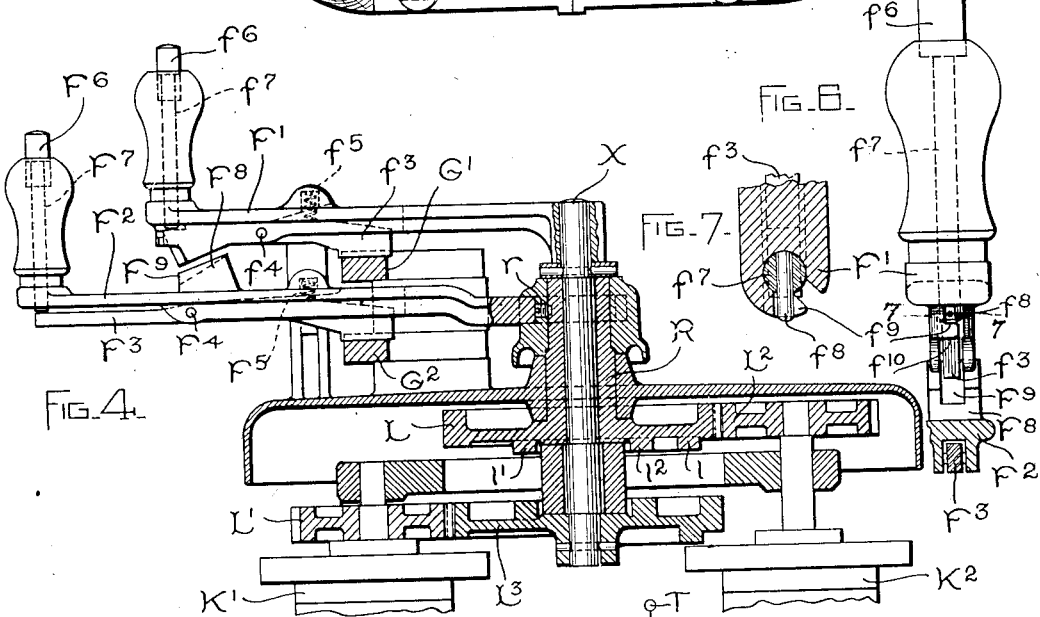
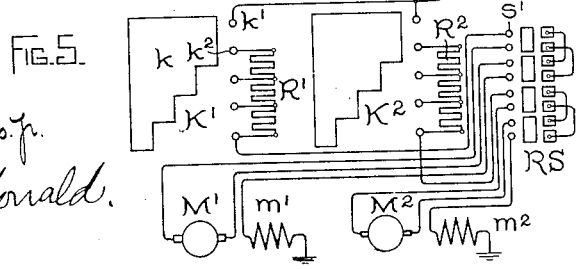
WITNESSES.
Edw. Williams Jr.
A. F. Macdonald.
INVENTORS.
Maxwell W. Day
John B. Linn,
by Albert G. Davis
Atty.

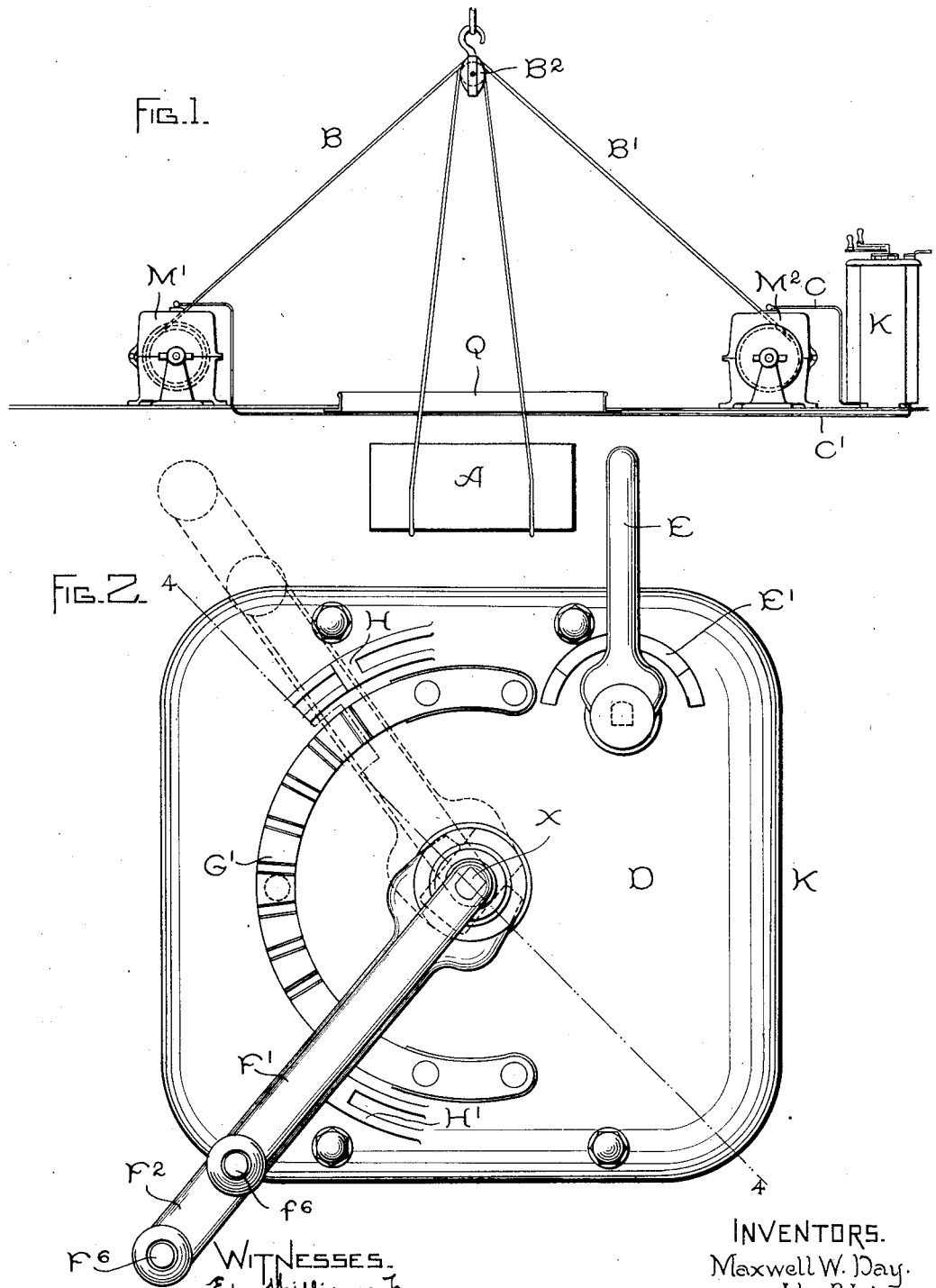

UNITED STATES PATENT OFFICE.

JOHN B. LINN AND MAXWELL W. DAY, OF SCHENECTADY, NEW YORK, ASSIGNORS TO THE GENERAL ELECTRIC COMPANY, OF NEW YORK.

CONTROLLER FOR ELECTRIC MOTORS.

SPECIFICATION forming part of Letters Patent No. 662,450, dated November 27, 1900.

Application filed September 17, 1898. Serial No. 691,192. (No model.)

*To all whom it may concern:*

Be it known that we, JOHN B. LINN and MAXWELL W. DAY, citizens of the United States, residing at Schenectady, county of Schenectady, in the State of New York, have invented certain new and useful Improvements in Controllers for Electric Motors, (Case No. 717,) of which the following is a specification.

Our invention relates to apparatus for controlling electric motors, and is particularly useful in connection with motors employed in the operation of hoists, though it is useful in various other relations.

In the operation of hoisting machinery it is highly desirable to employ two motors which are capable of independent speed regulation. This arrangement gives greater flexibility to the system and makes possible a far more accurate manipulation and adjustment of the load. For example, in lifting a beam it is sometimes necessary to raise one end faster than the other or higher than the other, or it may happen in handling a boat with a rope at the stern and one at the bow that more of the load comes upon one rope than upon the other, so that it is necessary or at least desirable to supply more current to one motor than to the other. On the other hand, it is frequently desirable that the two motors should be manipulated as one by a single handle.

To these ends our invention comprises a controller capable of governing two motors independently, and as another feature of the invention the connection is so arranged that when it is desirable the switches may be simultaneously actuated from a single handle. This feature of our invention is of course capable of extension to more than two motors, and the means for effecting this extension will be readily apparent without a minute description. In the controlling device we also provide a reversing-switch acting to reverse all of the motors simultaneously, so that the controller not only may operate the different motors at the same or different speeds, but may when desired simultaneously reverse them and then operate them either at the same or at different speeds, as may be desired. In the particular class of work already described this gives great flexibility of control.

For each of the two motors herein illustrated we might substitute two or more motors, treating the motors in groups, as already outlined. In that case instead of the simple resistance-switches, which we have shown as best adapted for the single motors illustrated, any suitable form of series-parallel switch, many of which are now well known in the art, might without invention be substituted for the device illustrated. We do not deem it necessary to illustrate and describe this particular arrangement, because it is one which would be readily apparent to engineers.

Our invention will be more fully described and its scope more clearly pointed out in the following specification and claims.

The drawings annexed show our invention in one of the forms which it may take.

Figure 1 shows a hoist with two motors and a controlling device. Fig. 2 is a plan of the controller. Fig. 3 is a plan with the top removed. Fig. 4 is a section on the line 4 4 of Fig. 2. Fig. 5 is a diagram of the circuits. Fig. 6 is an enlarged detail of one of the controller-handles, and Fig. 7 is a cross-section on the line 7 7 of Fig. 6.

Referring more particularly to Fig. 1, A is the load which is in process of being hoisted by means of cables B B', shown in this case as working through a block $B^2$. K is the controller, and C' $C^2$ are cables running between the controller and the motors M' $M^2$. Q is the guard-rail of the opening through which the load is being hoisted.

In Fig. 2, D is the top or cap plate of the controller carrying the handles, stops, and sectors. E is the handle of the reversing-switch R S, Fig. 3. E' is the sector or stop over which this handle works. This cap also carries two handles F' $F^2$, one mounted above the other, as seen more clearly in Fig. 4. Each of these handles works over a notched sector G' $G^2$, and these two sectors are arranged one above the other, as seen in plan in Fig. 2 and in elevation in Fig. 4. Stops H H' limit the movement of the handles F' $F^2$.

Referring to Figs. 3 and 4, it will be seen that a handle F' drives, through the shaft X, a gear-wheel L³, which meshes with the pinion L' on the cylinder K'. The handle F² is attached by set-screw $r$ to the sleeve R, which sleeve carries the gear-wheel L. This gear-wheel meshes with the pinion L², which in turn carries the controller-cylinder K².

It will be seen that the handle E actuates the reversing-switch R S, Fig. 5, and that the handles F' and F² actuate, respectively, the controllers K' and K².

It will be seen from Fig. 5 that the current enters at the terminal T and there divides. A portion passes the contact $k'$ on the controller K'. With the controller in the position shown the circuit is open at this point; but by moving the plate $k$ to the right in the figure connection is made between the contacts $k'$ and $k^2$. This allows current to flow from the terminal T by the contact K', plate $k$, contact $k^2$, and resistance R' to contact S' on the reversing-switch R S. Thence the current flows through the armature M' and the field-magnet $m'$, and thence to the other terminal and to ground. It is obvious that by moving the contact-plate $k$ farther to the right the resistance R' will be gradually cut out. It is also obvious that the relative direction in which the current passes through the armature or field-magnet $m$ depends upon the position of the reversing-switch R S, which is of ordinary construction and need not be more fully described here. It is also apparent that the controller K² serves to govern the motor M² by means of the resistance R² in a manner exactly similar to that just described. The single reversing-switch R S acts to reverse both motors.

The locking devices will now be described. The handle F² carries a rod or bar F³, which is pivoted at F⁴ and is normally held in the position shown by the spring F⁵. A knob F⁶, acting through the rod F⁷, serves to cause a slight left-handed rotation of the bar F³ when desired. A latch or detent on the right-hand end of the bar takes into the sector G². It will thus be apparent that the handle F², which, as above stated, controls the controller K², is normally locked into the position by the engagement of the arm F³ with the sector G², but may be disengaged and operated by pressing down the knob F⁶. The handle F' is provided with a rod $f^3$, pivoted at $f^4$ and acted upon by a spring $f^5$. A latch or detent on the rod $f^3$ takes into the sector G' and is capable of being depressed by the action of the knob $f^6$, working through the pin or shaft $f^7$.

Referring to Figs. 6 and 7, it will be seen that the shaft $f^7$ carries a pin $f^8$, which works in a bayonet-slot. When the knob $f^6$ is simply depressed until the pin $f^8$ strikes the upper edge $f^9$ of the bayonet-slot, the bar $f^3$ is caused to rotate about the pivot $f^4$ to such an amount as to allow its right-hand end to free itself from the sector G'. Thus it is apparent that the controller K' may be actuated by simply depressing the knob $f^6$ and moving the handle; but it is frequently useful to be able to actuate the two handles as one. To this end we provide upon the upper side of the arm F² a projection F⁸, provided with an opening F⁹. (Shown more clearly in end view in Fig. 6.) This opening is capable of receiving the lower edge of the rod or bar $f^3$. Simultaneous actuation of the two controllers is accomplished by pressing the knob $f^6$, Fig. 6, until the pin $f^8$ strikes the upper edge $f^9$ of the bayonet-slot, giving the knob $f^6$ a left-handed rotation, such as to cause the pin $f^8$ to slide to the right in the figure and further depressing the knob $f^6$. This will cause the rod $f^7$ to force down the bar $f^3$ until it enters the opening F⁹ and locks the two controller-handles together. They will stay locked together as long as the knob $f^6$ is held down. If it is desired to lock them permanently together, a slight left-handed rotation is now given to the knob $f^6$, so as to cause the pin $f^8$ to pass under the lower edge $f^{10}$ of the bayonet-slot.

As is usual in devices of this class, an interlocking mechanism is employed between the reversing-switch and the controlling-switches. Referring to Figs. 3 and 4, it will be seen that a star-wheel or cam I is mounted upon the shaft of the reversing-switch R S. A pair of pawls I' I², rigidly connected to one another and arranged to rotate around the same shaft, are urged in left-handed rotation by the spring S. The gear-wheel L is furnished with a segmental stop $l$. (Shown in dotted lines in Fig. 3 and in section in Fig. 4.) Further, this wheel is provided with two stops $l'$ $l^2$, which will engage a fixed stop $l^3$. It will be seen that with the pawl I² in the position shown the stop $l'$ prevents left-handed rotation of the wheel L, and the segmental stop $l$ of the pawl I² prevents right-handed rotation. A similar set of stops is provided upon the wheel L³ and are acted upon by the lower pawl I'. With the reversing-switch I³ in the position shown it is obvious that both of the controller-cylinders are locked; but if the reversing-switch is turned either to the right or to the left the spring S will retract the dogs or pawls I' I² and will allow the gear-wheels L and L³ to rotate. The segment $l$ on the wheel L or the corresponding segment on the wheel L³ will on any movement of either of the wheels lock the pawls I' I² and the reversing-switch R S.

What we claim as new, and desire to secure by Letters Patent of the United States, is—

1. A hoisting apparatus, provided with a number of motors acting upon a common load, means for regulating the motors to run at the same or different speeds as may be desired, and a common reversing-switch for all the motors.

2. A controlling device for a number of electric motors provided with a regulating-switch for each motor, handles for each switch, and interlocking means for the handles, such that each switch may be separately operated or all be moved by one handle.

3. In a controlling device for a number of electric motors, independent regulating-switches, a handle for each switch, and interlocking means for the handles such that a single handle may move all or only one of the switches.

4. A controlling device for a number of electric motors, comprising in combination a regulating-switch for each motor, independent means for operating said switches, and an interlocking device for effecting the simultaneous operation of said switches.

5. A controlling device for two motors, comprising a separate regulating-switch for each motor, a handle for each switch, and an interlocking mechanism between the handles, such that each switch may be actuated independently when the handles are not interlocked, and both switches may be operated by one handle when the interlock is effective.

6. In a controlling device for electric motors, the combination of a number of motors, a separate regulating-switch for each motor, and a common reversing-switch for all the motors.

7. An interlocking mechanism for the handles of switches, comprising a lug upon one of the handles, a pawl upon the other coöperating with the lug, and means for locking the pawl to the lug.

8. In combination two independent switches, separate handles for operating said switches, a lock for each of said handles, means for unlocking one of said handles and simultaneously interlocking the two handles, and means for unlocking the other handle.

9. In combination, two switches, independent handles for operating said switches, a locking-detent for each of said handles, a series of notches in coöperative relation with each of said detents, an interlocking device for locking the two handles together, means operating one of said detents, and a second means operating the other detent and said interlocking device.

10. A controlling device for electric motors, comprising in combination two independent controlling-switches, a shaft, a sleeve surrounding said shaft, means operatively connecting the shaft with one of said switches, means operatively connecting the sleeve with the other of said switches, independent means for rotating said sleeve and said shaft, and an interlocking device for locking the sleeve and shaft together.

11. In combination in a controlling device for electric motors, two independent controlling-switches, a reversing-switch, independent means for operating said switches, an interlocking device for effecting, when desired, the simultaneous operation of said controlling-switches, and a second interlocking device for preventing the operation of the reversing-switch when either of the controlling-switches is in operative position.

12. In combination in a controlling device for electric motors, two independent controlling-switches, a reversing-switch, independent means for operating said switches, an interlocking device for effecting, when desired, the simultaneous operation of said controlling-switches, and a second interlocking device for preventing the operation of the reversing-switch when either of the controlling-switches is in operative position, and for preventing the operation of either of the controlling-switches when the reversing-switch is open.

13. In combination in a controlling device for electric motors, a plurality of controlling-cylinders, a reversing-cylinder, switch-contacts carried by each of said cylinders, means whereby the said controlling-cylinders may be operated independently or both together, and interlocking means for preventing the operation of the reversing-cylinder when the controlling-cylinders are in operative position.

In testimony whereof we have hereunto set our hands this 16th day of September, 1898.

JOHN B. LINN.
MAXWELL W. DAY.

Witnesses:
A. F. MACDONALD,
B. B. HULL.